US007734661B2

(12) United States Patent
Jordan et al.

(10) Patent No.: US 7,734,661 B2
(45) Date of Patent: Jun. 8, 2010

(54) METHOD AND APPARATUS FOR ACCESSING MULTIDIMENSIONAL DATA

(75) Inventors: Philip Martin Jordan, Auckland (NZ);
Keith Steffen Ng, Auckland (NZ);
Michael John Sanders, Auckland (NZ);
Jerry Stewart, Auckland (NZ)

(73) Assignee: Descisys Limited, Auckland (NZ)

( * ) Notice: Subject to any disclaimer, the term of this patent is extended or adjusted under 35 U.S.C. 154(b) by 1292 days.

(21) Appl. No.: 10/915,570

(22) Filed: Aug. 11, 2004

(65) Prior Publication Data

US 2005/0071349 A1    Mar. 31, 2005

Related U.S. Application Data

(60) Provisional application No. 60/493,812, filed on Aug. 11, 2003, provisional application No. 60/493,783, filed on Aug. 11, 2003.

(51) Int. Cl.
*G06F 7/00* (2006.01)

(52) U.S. Cl. .................... 707/803; 707/751; 707/795; 707/796; 707/810

(58) Field of Classification Search ............. 707/1, 707/2, 3, 4, 999.001, 999.002, 999.1, 999.101, 707/999.2
See application file for complete search history.

(56) References Cited

U.S. PATENT DOCUMENTS

| | | | | |
|---|---|---|---|---|
| 5,359,724 | A | 10/1994 | Earle | 395/425 |
| 6,122,636 | A | 9/2000 | Malloy et al. | 707/102 |
| 6,289,352 | B1 | 9/2001 | Proctor | 707/102 |
| 6,317,750 | B1 | 11/2001 | Tortolani et al. | 707/103 |
| 6,381,605 | B1 | 4/2002 | Kothuri et al. | 707/100 |
| 6,397,195 | B1 | 5/2002 | Pinard et al. | 705/30 |
| 6,405,208 | B1 | 6/2002 | Raghavan et al. | 707/102 |
| 6,574,619 | B1 | 6/2003 | Reddy et al. | 707/2 |
| 6,601,062 | B1 | 7/2003 | Deshpande et al. | 707/3 |

(Continued)

FOREIGN PATENT DOCUMENTS

WO    WO 99/38094    7/1999

(Continued)

OTHER PUBLICATIONS

Tao et al., "Adaptive Index Structures", 2002, Proceeding of the 28th VLDB Conference, pp. 1-12.*

(Continued)

*Primary Examiner*—Hung Q Pham
(74) *Attorney, Agent, or Firm*—Pillsbury Winthrop Shaw Pittman, LLP (57) ABSTRACT

A method of indexing data in a multidimensional database includes creating a multidimensional logical access model, creating a multidimensional data storage model in which data is located in cells that are stored and retrieved in blocks, gathering data access information derived from one or more user queries of the database, and reorganizing one or more selected cells in the multidimensional data storage model based on the data access information to reduce the time taken to access the one or more selected cells in response to a user query of the database. A computerized apparatus in communication with a multidimensional database includes a program to perform the method. A computer readable medium contains instructions to cause a computer to perform the method.

17 Claims, 9 Drawing Sheets

U.S. PATENT DOCUMENTS 7,080,081 B2 *  7/2006  Agarwal et al. ............. 707/100
2003/0088548 A1  5/2003  Kumar et al. .................. 707/3

FOREIGN PATENT DOCUMENTS

WO   WO 01/93111 A2   12/2001

OTHER PUBLICATIONS

Codd et al., "Providing OLAP to User-Analysts: An IT Mandate,", E.F. Codd Associates, 1993, pp. 1-20.
Pedersen et al, "Multidimensional Database Technology," IEEE, Dec. 2001, pp. 40-46.
Ramsak et al., "Interactive ROLAP on Large Datasets: A Case Study with UB-Trees," IEEE, 2001, pp. 1-10.

* cited by examiner

METHOD AND APPARATUS FOR ACCESSING MULTIDIMENSIONAL DATA

CROSS REFERENCE TO RELATED APPLICATIONS

This application claims priority from U.S. Provisional Patent Application No. 60/493,812, filed Aug. 11, 2003 and is related to U.S. Provisional Patent Application No. 60/493,783 filed Aug. 11, 2003, and co-pending U.S. Application entitled "Method and Apparatus for Data Validation in a Multidimensional Database," filed Aug. 11, 2004. The contents of each of these applications are incorporated herein by reference.

FIELD OF THE INVENTION

This invention relates to a method and apparatus for accessing multidimensional data. More particularly, but not exclusively, the invention relates to a method and apparatus for data storage and retrieval for online analytical processing (OLAP).

BACKGROUND

There is a growing need for sophisticated information analysis amongst businesses as they become increasingly reliant upon their ability to analyse and synthesise business information from their information systems.

Most businesses collect data which has more than two dimensions, so it is not conveniently displayed in the form of a spreadsheet for basic analysis. Therefore, a commercial entity may have a number of different products or services which are sold through a number of different outlets in different geographical regions over time. Analysis of this data may involve calculations across a number of dimensions, for example calculating the number of units of each product sold over a selected time period through a selected number of outlets. It is also highly desirable to perform analysis of such data "on line" so that the results are based on current data. This analysis is usually referred to as On Line Analytical Processing (OLAP).

The problems associated with OLAP are well known to those skilled in the art to which the invention relates. However, a brief outline is provided below to assist understanding of the background to the invention.

If the data to be analysed has three dimensions, then this may be conveniently visually represented in a cube. For example, in FIG. 1 the quantity of products referred to as Widget 1 and Widget 2 sold in the years 2001 and 2002 at locations X and Y is illustrated.

Each item of data, being a scalar value representative of the number of products sold, is provided in a cell within the cube, and the cell is addressed by the dimensions along the axis of the cube. For example, the cell 101 of FIG. 1 is located at (2002, location Y, Widget 1) and returns a value of 1, being representative of 1 unit of Widget 1 being sold at location Y in 2002.

Figure 1:
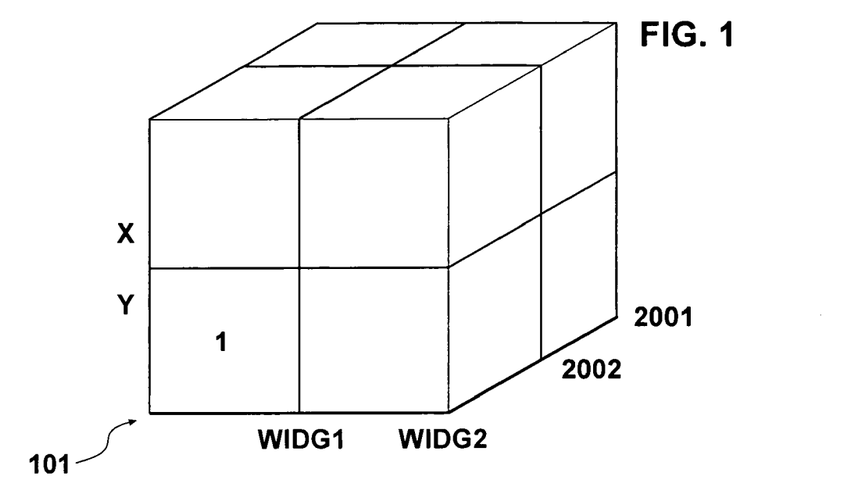
FIG. 1: is a diagram of data structure according to a known multi dimensional database model.

The example illustrated in FIG. 1 is very simple. In reality, financial data that a business may wish to analyse will often have at least four dimensions and possibly up to 20 or more dimensions. This can make analysis extremely complex. To begin with it must be appreciated that as the dimensions increase, or are subdivided, then the number of cells increases dramatically. In the example of FIG. 1 if the time dimension is split into months, so as to provide a total of 24 months, and there are ten different products (rather than two) which are sold at twenty different locations (rather than two), then there will be 4,800 cells. If we add another dimension such as the colour of each product sold, there being say five different colours, then the number of cells becomes 24,000. Similarly, there will typically be other dimensions, and these will make the number of cells increase again.

In performing any analysis, the data content of many of the cells needs to be selectively accessed to perform a calculation in response to a user query so that the result of the query may be reported. Therefore, an index is required for any multi dimensional database to enable cells to be located, read and returned for calculation purposes.

In practical applications, such as financial data analysis, many of the cells may contain null values, i.e. contain no data. These cells will often relate to certain combinations of dimensions that vary depending on the business entity that the database is attempting to model. Therefore in practice there are many regions within the multidimensional model which are sparsely populated by data and other areas which are densely populated by data. In the sparsely populated areas, data is inefficiently stored, but in order to preserve the integrity of the model, cell locations are still provided for even though those cells may be null cells.

Therefore, there are two significant problems with multi dimensional databases. One is the sheer size of the storage space that needs to be allocated. The other is speed of access. Quite apart from performing the required calculations, access in the desired cells in the vast array of data can add significantly to the time taken to process a query. Therefore, having an index and data storage system which will lead to the efficient storage of data and quickly return data from selected cell locations without requiring intensive reading operations is highly advantageous.

OLAP products are generally split into two different archetypes: Multidimensional OLAP (MOLAP) and Relational OLAP (ROLAP). ROLAP systems use a relational database to store the multidimensional data in unstructured tables. MOLAP systems use a multidimensional database and current MOLAP implementations store the data so that it is tightly bound to the multidimensional logical structure. This approach provides high performance when data is accessed in the same way that the structure is organised. However it lacks the flexibility to adapt to different types of access than those that were foreseen at the time the logical structure was defined.

Additionally, existing MOLAP systems typically need to be taken offline to modify the multidimensional logical structure.

It is an object of the present invention to provide improved methods, apparatus or systems for multi dimensional database indexing or data access which at least partially overcome one or more problems of known systems, or to at least provide the public with a useful choice.

Further objects of the present invention may become apparent from the following description, given by way of example only.

| Definitions | |
|---|---|
| Cell: | A location in a multidimensional database. A cell is a tuple of members. |
| Dimension: | A set of hierarchically related members. |
| Grid: | A 2 dimensional representation of a multidimensional space. A single cell on a grid represents a single cell of data in multidimensional space. The rows and columns of a grid represent members of a dimension. |

-continued

| | Definitions |
|---|---|
| | Dimensions not appearing in either row or column of a grid are fixed to a single (offsheet) member. |
| Member: | A unique position on a dimension that includes in itself or points to data. |
| OLAP: | On-Line Analytical Processing. A category of applications and technologies that allow the collection, storage, manipulation and investigation of multidimensional data. |
| OLAP Server: | An application that provides OLAP functionality over a multidimensional database. |
| Outline: | The set of all dimensions in a multidimensional database. |

Throughout this specification, data in the multidimensional database has been referred to by reference to members and cells. However, this terminology is not intended to limit the scope of the invention to any particular data format in a multidimensional database.

Unless the context clearly requires otherwise, throughout the description and the claims, the words "comprise", "comprising", and the like, are to be construed in an inclusive sense as opposed to an exclusive or exhaustive sense, that is to say, in the sense of "including, but not limited to".

SUMMARY OF THE INVENTION

In one aspect the invention consists in a multidimensional data storage and retrieval system in which data is stored independently of the multidimensional logical access model.

In another aspect the invention consists in a method of indexing data in a multidimensional database, the method including creating a multidimensional logical access model, creating a multidimensional data storage model in which data is located in cells that are stored and retrieved in blocks, gathering data access information derived from one or more user queries of the database, and reorganizing one or more selected cells in the multidimensional data storage model based on the data access information to reduce the time taken to access the one or more selected cells in response to a user query of the database.

In a preferred embodiment the step of reorganizing cells includes reorganizing cells into new or existing blocks so that cells that are likely to be accessed together are provided in the same block.

The step of reorganizing may include performing a first calculation of the cost of access to the one or more selected cells prior to reorganization and a second calculation of the expected cost of access to the one or more selected cells after reorganization, and reorganizing the one or more selected cells if the second calculation returns a lower cost than the first calculation.

The data access information preferably includes identification of all cells that have been accessed and the number of times that each cell has been accessed, and the step of reorganizing includes determining which cells have been accessed more frequently than others, and for each of the frequently accessed cells determining which other cell has been most frequently accessed with that frequently accessed cell, then moving one or both of those cells into the same block.

Preferably the step of creating the multidimensional logical access model includes creating a dimensionally hierarchical index tree.

The method may also include determining from the data access information one or more selected sub-trees of the multidimensional logical access model that index selected cells that are likely to be accessed together, and re-ordering the structure of the one or more of selected sub-trees by either merging the selected one or more sub-trees, or re-ordering the dimensional hierarchy of the one or more selected sub-trees so that fewer branches of the index tree are required to be accessed to access the selected cells.

The step of merging the one or more selected sub-trees may include merging related leaf level nodes of the one or more sub-trees. It may alternatively include merging the lowest two or three dimensions, or merging two to fifty members in a dimension.

Preferably re-ordering the dimensional hierarchy includes performing a member frequency analysis for the selected cells' non-fixed dimensions, sorting the results of the analysis to provide a list of non-fixed dimensions sorted by the number of members in each from the non-fixed dimension with the least number of members to the non-fixed dimension with the largest number of members, and re-ordering the one or more sub-trees in accordance with the list.

A re-ordering threshold may be provided, so that the order of any two dimensions may be changed if the proportional difference between the members for each dimension is greater than the re-ordering threshold.

Preferably the method includes re-organizing cells within blocks following any change in dimension order.

The method may include defining a path limit, analysing the index path distance between each cell in the one or more sub-trees and the block to which the cell belongs, and re-organising the cell into another block if the index path for the cell exceeds the path limit.

Reorganization of the one or more selected cells in the multidimensional data storage model preferably does not necessitate any change to the multidimensional access model.

The data access information may include statistical information identifying cells that are likely to be accessed in future user queries.

In a preferred embodiment the time required to access a cell in a previously retrieved block is less than the time required to access a cell in a non-retrieved block.

In another aspect the invention consists in a method of indexing data in a multidimensional database, the method including creating a multidimensional logical access model comprising a dimensionally hierarchical index tree, creating a multidimensional data storage model in which data is located in cells that are stored and retrieved in blocks, gathering data access information derived from one or more user queries of the database, determining from the data access information one or more selected sub-trees of the multidimensional logical access model that index selected cells that are likely to be accessed together, and re-ordering the structure of the one or more of selected sub-trees by either merging the selected one or more sub-trees, or re-ordering the dimensional hierarchy of the one or more selected sub-trees so that fewer branches of the index tree are required to be accessed to access the selected cells.

Merging the one or more selected sub-trees preferably includes merging related leaf level nodes of the one or more sub-trees. Alternatively the method includes merging the lowest two or three dimensions, or merging two to fifty members in a dimension.

In a further aspect the invention consists in a method of accessing data in a multidimensional database including a multidimensional logical access model and a multidimensional data storage model in which data is located in cells that are stored and retrieved in blocks, the method including:

receiving a user query requiring the cell data to be obtained, search blocks that have been retrieved for the required cell, if the required cell is located, then return the cell data, if the required cell is not located, then use the multidimensional logical access model to locate the required cell and return the cell data.

In another aspect the invention consists in a method of indexing a plurality of cells of a multidimensional database, the method including creating a hierarchical index for indexing the cells, arranging the cells in groups, providing an identifier for each cell in the index, the identifier identifying the group in which the cell relating to the identifier resides, determining which cells are likely to be accessed together, rearranging the groups or rearranging the cells amongst the groups so that cells that are likely to be accessed together are included in the same group, and updating the identifier.

In another aspect the invention consists in a method of indexing a plurality of cells of a multidimensional database, the method including providing a dimensionally hierarchical index tree for indexing the multidimensional data, determining one or more selected sub-trees of the index that index selected cells that are likely to be accessed together, and re-ordering the structure of the one or more of selected sub-trees by either merging the selected one or more sub-trees, or re-ordering the dimensional hierarchy of the one or more selected sub-trees so that fewer branches of the index tree are required to be accessed to access the selected cells.

In a further aspect the invention consists in computerised apparatus in communication with a multidimensional database and operable to perform the method of any one of the preceding paragraphs.

In a further aspect the invention consists in a computer program or a computer readable medium containing instructions to cause a computer to perform the method of any one of the preceding paragraphs.

In a further aspect the invention consists in a computerised database management system for a multidimensional database comprising cells formed from a tuple of members, the computerised database management system comprising a communication interface for reading from and writing to a database, computer processing means for controlling the operations of the database management system and computer memory containing an instruction set readable by said computer processing means, wherein when the instruction set is executed by the computer processing means the computerised database management system uses said communication interface to implement a method according to any one of the preceding paragraphs.

BRIEF DESCRIPTION OF THE DRAWINGS

A preferred embodiment of the present invention will be described with reference to the accompanying drawings in which.

DETAILED DESCRIPTION

The invention provides a multidimensional data storage and retrieval system in which data is stored independently of the multidimensional logical access model.

The separation of the logical access model from the data storage provides a number of performance benefits. Firstly, data access can be optimized quite separately from the logical access model. This is advantageous because there will always be database queries that are incongruent with the structure of the logical access model. Secondly (and of increasing importance as database size is increased) separation allows the multidimensional structure to be modified without having to take the database offline.

Existing MOLAP implementations which use tight-binding between structure and data result in a database that is only optimized for one type of access. The choices the database designer makes when creating the multidimensional structure determines the types of queries that will perform well, and those that will perform poorly. There is no scope for local optimization where one area of the database is being accessed in a totally different way to the structure.

By contrast, the present invention allows the separation of the logical access model from the data storage. This allows broad optimization that the database design implicitly provides in the arrangement of the multidimensional structure, while remaining free to re-organize any areas of data that are being accessed in a different manner to the general arrangement. This freedom allows the database management software to automatically reorganize data in response to queries, and thereby automatically improve the database's performance.

By separation of the logical access model from the data storage model the following conceptual assignments of responsibility are made:
 1. The multidimensional logical access model structure's purpose is to capture the target domain's logical structure. Its purpose is to define the presentation of data, not query optimization.
 2. The data storage system's purpose is to arrange data to best suit the way in which it is being accessed. Its purpose is performance, not presentation.

Figure 2:
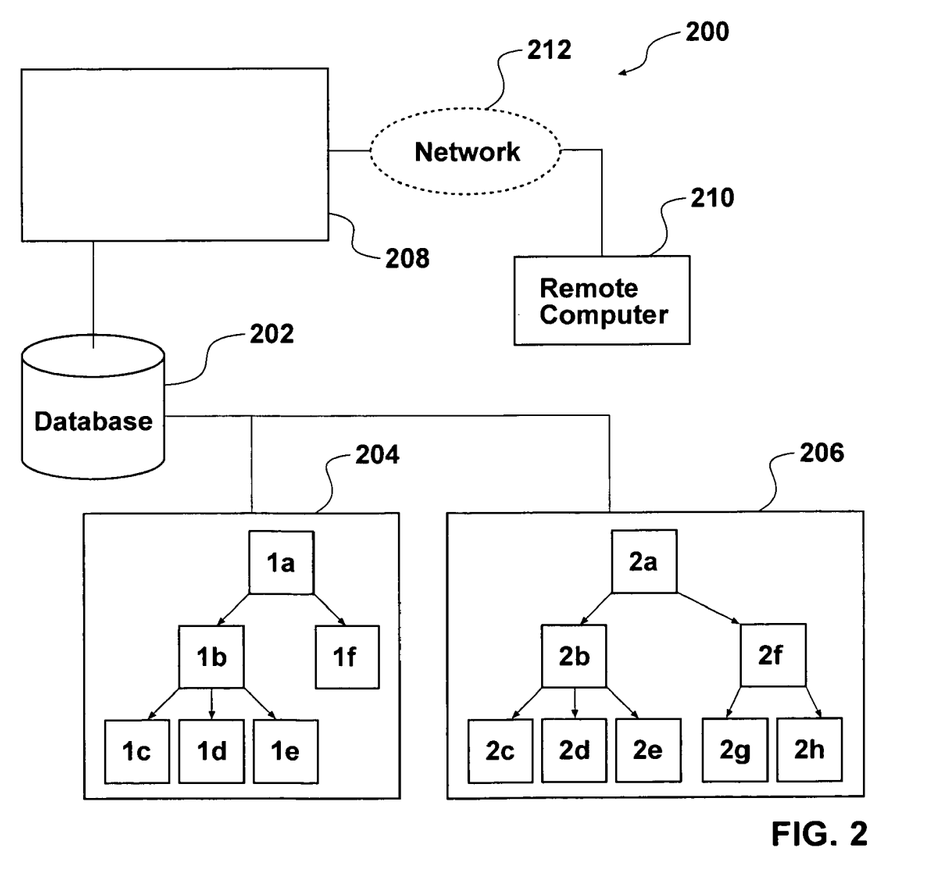
FIG. 2: is a diagram of a system on which the invention may be implemented.

Referring to FIG. 2, a diagrammatic representation of an example of a computer system in which the present invention has been implemented is shown and generally referenced by arrow 200. A database 202 is provided, containing a multidimensional data space that may be arranged in a hierarchical manner. Two branches from the hierarchical structure of the database 202 are referenced 204 and 206. Each branch 10, 11 is made up of a plurality of members referenced 1a-1e and 2a-2h respectively. The unit of information in the database that is queried is a cell, defined by a tuple of members (M1, M2, M3 . . . MN), where M1 to MN represents one member from each of the N dimensions in the database 202. A cell is either populated with a numeric value, or is empty. An empty cell has an implicit value of null. A cell is typically formed by a member from every dimension in the database. However, a cell may alternatively be formed only by members from a selection of dimensions and in the limit may be formed by one member only.

In communication with the database 202 is a database management system (DBMS) 208. The DBMS 208 may be an OLAP server.

The database 202 may be queried using a remote computer 210 running a suitable application, which may communicate with the DBMS 208 through a local or wide area network 212. Suitable computer processors, communication interfaces and data storage mechanisms for the computer system 200 shown in FIG. 2 are well known in the relevant arts and therefore will not be described further in this document.

A user of the system will input queries for the database and receive the results back from the DBMS 208 by operating the remote computer 210, using an input device such as a keyboard and point and click device. The DBMS 208 then retrieves the relevant information from the database 202, performs any required calculations and returns the result to the remote computer 210 for display to the user. A calculation system and validation system for the DBMS are described in our co-pending application No. 60/493,783 entitled "Method And Apparatus For Data Validation In A Multidimensional Database" which has the same filing date as the present application. The contents of this co-pending application are hereby incorporated herein in their entirety.

Although in the description herein, it is assumed that the remote computer 210 is a "dumb" terminal in relation to managing the database 202, those skilled in the relevant arts will appreciate that the remote computer 210 may perform some of the functions of DBMS 208 described herein, with suitable mechanisms in place to lock data while any particular computer is performing an operation on that data. Also, the processing capabilities of the DBMS 208 may be distributed amongst a plurality of computer processors.

In a preferred embodiment of the invention, the data is typically data that may be processed by processing systems or apparatus referred to as OLAP systems or servers. Such data may relate to the business or financial processes and information of a business entity. Those skilled in the art will realise that the invention is also applicable to other data that has multiple related dimensions.

The data on database 202 must be indexed in order to keep track of the location of the data that exists in the system and to reliably indicate where the data is located.

In relation to a multidimensional database index, a practical index must not only identify whether a cell exists at a particular location and if that cell exists what its value is, but also needs to be scalable up to large numbers of cells ($1\times10^9$) and medium dimensions (e.g. up to 50). It is also advantageous if such an index is divisible and workable by parts since it may not be able to be held entirely in the main memory. An index that supports updates by part is also desirable so that the system is not forced to lock the whole index when adding, deleting or relocating a few cells. The preferred embodiment of the invention provides such an index.

Figure 3:
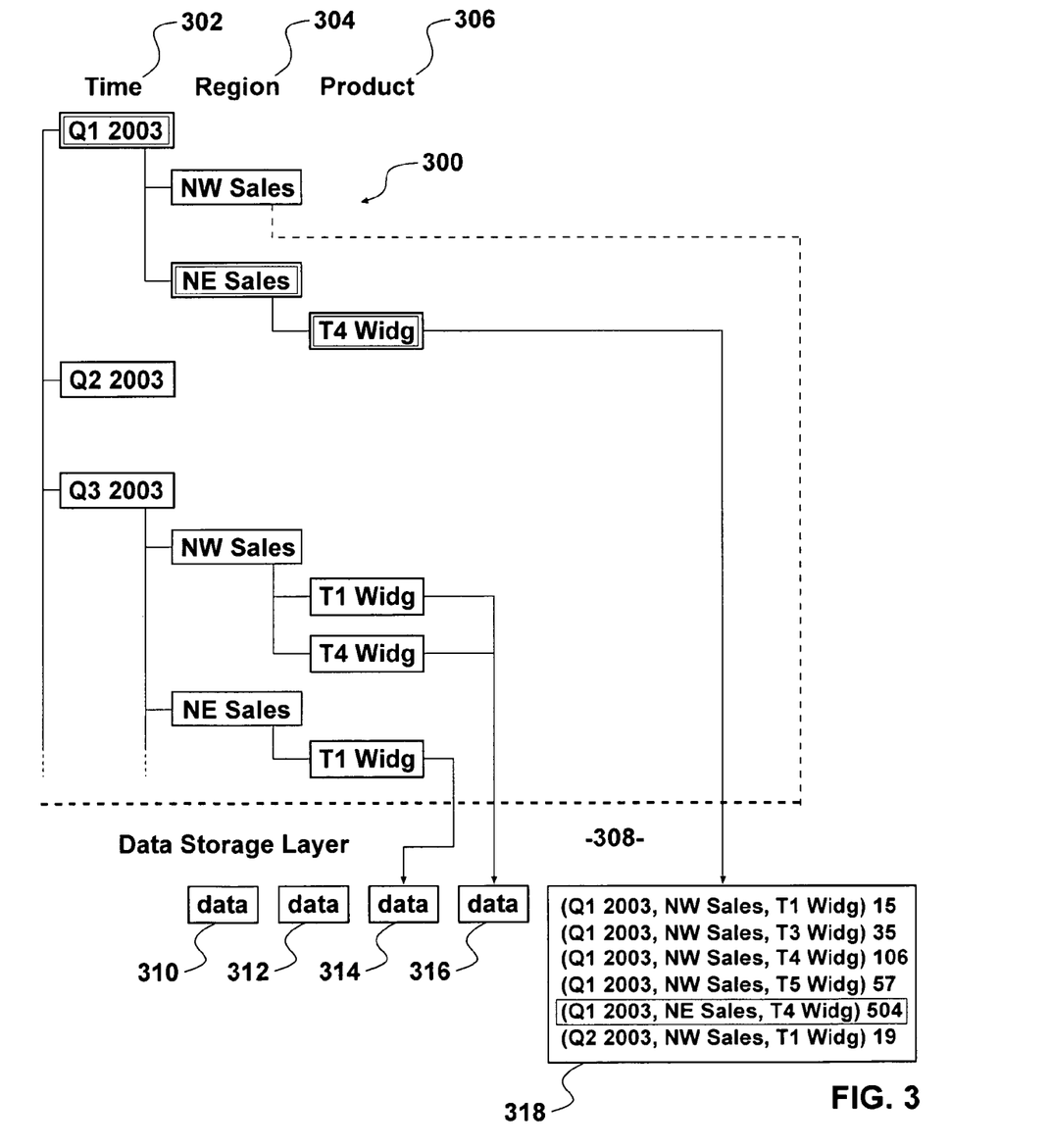
FIG. 3: illustrates a hierarchal index according to the invention.

In FIG. 3, an illustration of an index according to a preferred embodiment of the present invention is shown which uses a hybrid hierarchal/linear architecture that we have found can be implemented on a standard relational database to yield high performance.

The hierarchal index structure shown in FIG. 3, has a hierarchy organised dependent on dimension in a tree structure generally referenced 300. Therefore, in FIG. 3 a simple set of dimensions is illustrated being Time 302 (Quarter, Year), Region 304 (North East, North West) and Product 306 (Widget 1-Widget 4).

The time dimension is effectively the root of the tree which then branches to the regions and finally to leaf entries relating to individual product types. Each unique path through the tree from root to leaf corresponds to a unique cell location. Furthermore, the cell data is not stored at the leaf level entries. Instead, there is a separate data structure 308 which is referred in the Figure as the data storage layer and each leaf level entry in the index tree points to a predetermined specific group or block of cells 310-318 in the data storage layer. As can also be seen from the Figure, leaf level entries do not point to specific locations within data blocks, i.e. they do not point to the specific cell, but instead point to data blocks themselves. Cell data is sorted within data blocks by full cell location. We have found that this enables very quick look up, as we describe further below.

Figure 4:
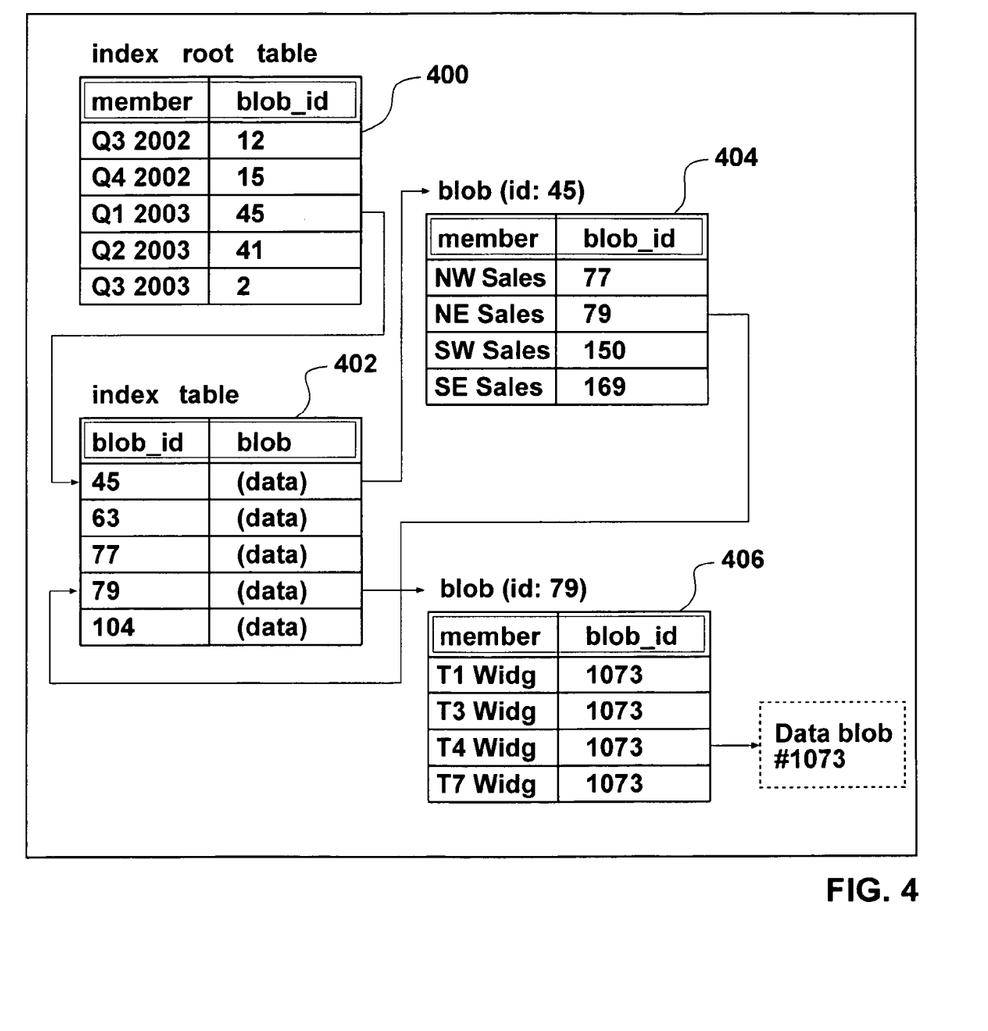
FIG. 4: illustrates relational database tables used to store the index structure of FIG. 2.

In FIG. 4, the hierarchal index described above with reference to FIG. 3 is shown by way of example stored in relational database tables.

An index root table 400 is provided which holds root dimensions. In this example the root dimensions are each quarter of each year. These are mapped to index entries for the second lower dimension i.e. the next lower dimension in the hierarchy in index table 402. In FIG. 4, member "Q1 2003" is mapped to the index entry with an identifier no. 45. The index tables map each of the identifiers to the next dimension. In the example illustrated in FIG. 4, it can be seen that the branches of the tree for that next dimension are all stored as data (shown as table 404) relating to identifier no. 45. In the preferred embodiment, objects, most preferably Blobs (binary large objects), are used to store the branches of the tree structure in the relational database table. We have found that Blobs allow a significant amount of information to be stored in a single table row and this provides significant advantages with inserting/reading/updating each row of data, as described further below.

Therefore, each Blob structure contains (member, blob_id) pairs, mapping members to their next index Blob as progress is made down the hierarchal index by dimension. As shown in FIG. 4, the last blob_id points to a block of data in the form of a data Blob rather than another index entry Blob. Upon retrieving the data Blob, a simple binary search is all that is required to locate and return the data for the cell the system requested.

In FIG. 4, the index entries that store the cell locations (Q1 2003 NE sales, T4 WIDG) are retrieved by starting at the root with member "Q1 2003", and following the chain of pointers. This leads through index Blobs 45 and 79 (having associated table 406), and eventually to data blob_id 1073. Upon retrieving data Blob 1073, a simple binary search is performed to locate and return the data for that cell.

This structure is applicable to a hierarchical tree having further dimensions than the tree illustrated in FIG. 3. For example, if a further dimension existed between sales and product type, then blob_id 79 in the index table could be paired to data representative of the nodes of the further dimension. The further nodes are then paired in the index table to blob_ids for the next dimension (products) which are paired in turn to data blobs.

A major performance problem with relational database applications is the cost of selecting from, inserting into, and updating rows in database tables. The database must provide a number of functions for effective operation and these include locking, transaction buffers, generalised indexing and constraint checking amongst others. All of these contribute to an extremely high I/O cost (and therefore additional access time), compared to manipulating data in an application's native memory. Therefore, substantial gains can be made in performance by reducing the number of database I/O operations.

The index structure described above with reference to FIGS. 3 and 4 is optimised for closely related cell addresses. As outlined earlier in this document, the exemplary data in relation to FIGS. 3 and 4 is simplified for purposes of explanation. In reality, there may typically be hundreds of entries at the leaf level of the tree for each path from the root. When the number of cell addresses on this level is appreciated, the advantages of the present indexing system may be seen. We provide an example below.

EXAMPLE 1

Best Case Performance

The indexing system of the present invention, as described with reference to FIGS. 3 and 4 contains cells of the form: (Q1 2003, NE Sales, T1 Widg) through to (Q1 2003, NE Sales, T1000 Widg). Because these cells differ only in the last member, there are only three relational rows relating to all these cells. If these cells need to be returned, updated, or if new types of widget need to be inserted in the same location, then a total of three database reads and zero or one database write is all that needs to be performed. This allows very quick access.

On the other hand, data access that is not congruent with dimension ordering of the index leads to poorer performance. An example is provided below.

EXAMPLE 2

Worst Case Performance

We now provide an example of worst case performance based on the index as described with reference to FIGS. 3 and 4:

The indexing system contains cells of the form (Q1 1990, NE Sales, T1 Widg) through to (Q4 2003, NE Sales, T1 Widg). Because these cells differ in the first member, the index tables will contain three relational rows per cell. If these cells need to be returned, updated, or if data for new quarters needs to be inserted, then three database reads and zero or one database writes must be performed per cell. In this case, the index will perform substantially worse than if the same cells had been stored in a simple relational table.

The preferred embodiment provides a number of ways to overcome worst case performance. These will be discussed further below.

One way of avoiding worst case performance is to find or modify cell data without having to look at the index. This overcomes the necessity of the database reading and writing steps. We have found that a run time protocol may be used which invokes a contract between the hierarchal index and the data storage layer. The contract is as follows:

1. A party wishing to insert or delete a cell must obtain write locks on all the affected index table rows and on the affected data blob(s). Relational databases have highly evolved transaction management. The relational database that is used in the preferred embodiment for the underlying storage for the index provides this behaviour.
2. A party wishing to return or update an existing cell only need obtain a lock on the data blob in which the cell resides. This behavior derives from (1), in which it is implied that no one else can update or delete the cell in question while there is a lock upon its data blob (even if there are not locks on the index entries that point to this data blob).

Thus, reconsidering example 2 above in which cells of the form (Q1 1990, NE Sales, T1 Widg) through to (Q4 2003, NE Sales, T1 Widg) must be returned or updated, the database may not have to be accessed three times per cell after all. The arrangement of cells within data blobs determines the number of database accesses that have to be performed. If all the cells being sought reside in one data blob, the database does not need to be accessed again after retrieving the first cell. Therefore, three database reads and zero or one write will update all the required cells.

An algorithm for returning or updating cells according to a preferred embodiment of the invention is set forth below.

Algorithm for Returning or Updating Cells

1. Before accessing the hierarchical index, search through the data blobs that have already been retrieved (and implicitly locked). If the sought cell is found, return or update the cell data (no index access being required).
2. If the sought cell cannot be found in the data blobs that have already been retrieved and locked, look up the sought cell in the hierarchical index. Retain locks on all referenced index and data blobs until the current transaction ends.

Figure 5:
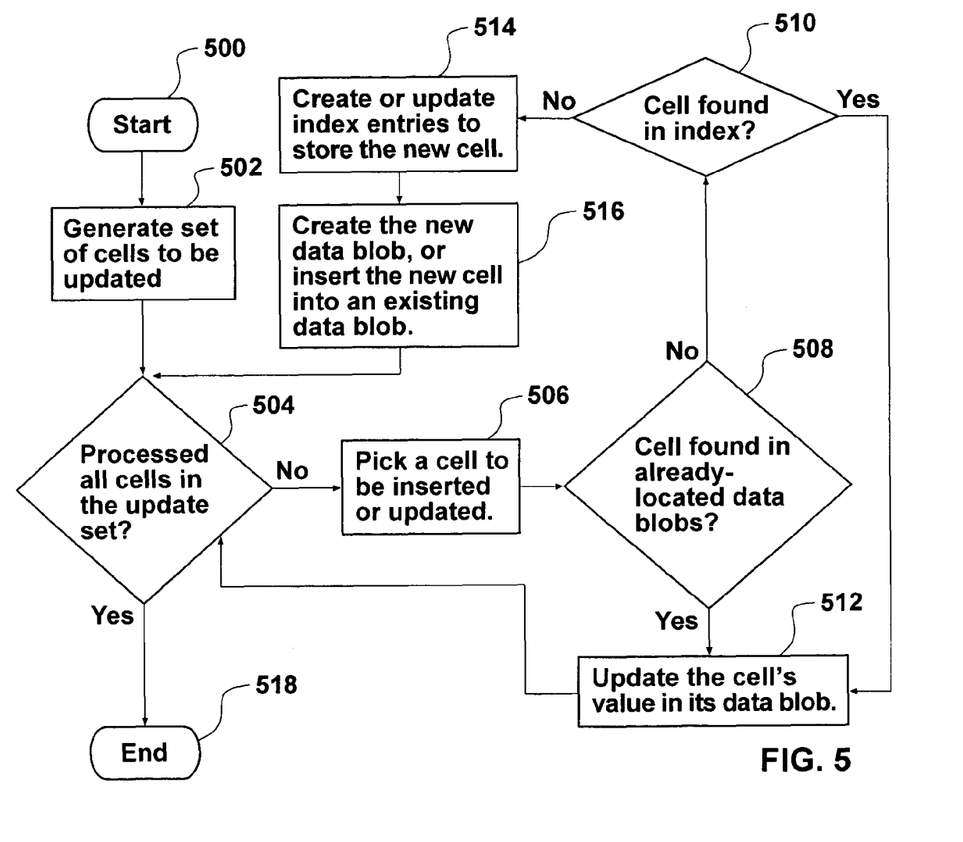
FIG. 5: is a flow chart illustrating a process of setting cells.
Figure 6:
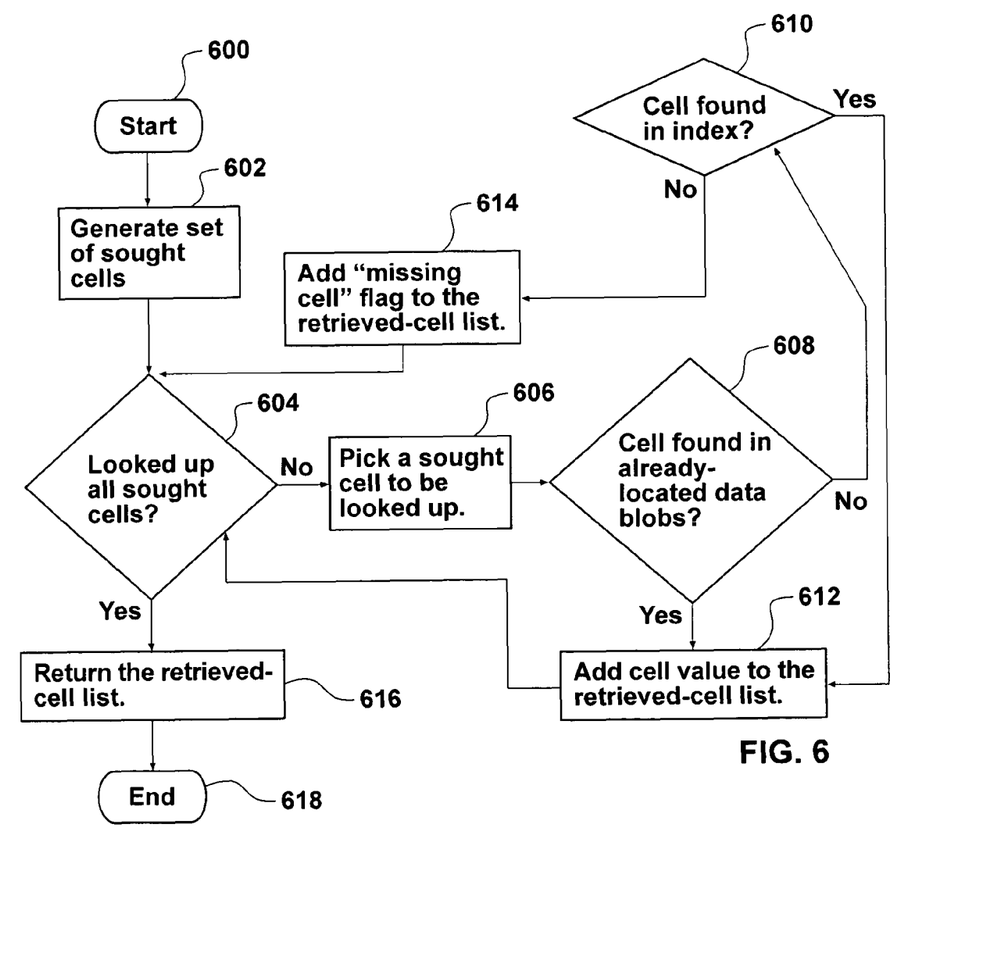
FIG. 6: is a flow chart illustrating a process of retrieving cells.

FIGS. 5 and 6 are flow charts that provide examples of more detailed algorithms for setting and retrieving cells. Referring to FIG. 5, the algorithm begins at step 500 following which one or more cells is selected for updating in step 502. In decision step 504 a check is performed to see whether all the selected cells have been processed. If not, then a cell is chosen in step 506 and a search of cells that have already been retrieved is performed in step 508. If the cell is found then its value i.e. the data is updated in step 512. If the cell is not found, then a search of the index is performed in step 510. If the cell is found then the update step 512 occurs. If it is not found then the index entries are updated in step 514 to store the new cell following which a new data blob is created or the new cell is inserted into an existing data blob in step 516. Once all the selected cells have been processed, the algorithm ends in step 518.

In FIG. 6 the algorithm begins at step 600 following which one or more cells is selected for retrieval in step 602. In decision step 604 a check is performed to see whether all the selected cells have been processed. If not, then a cell is chosen in step 606 and a search of cells that have already been retrieved is performed in step 608. If the cell is found then its value i.e. the data is added to a retrieved-cell list in step 612. If the cell is not found, then a search of the index is performed in step 610. If the cell is found then the retrieval step 612 occurs. If it is not found then a "missing cell" flag is added to the retrieved-cell list in step 614. Once all the selected cells have been processed, the retrieved-cell list is returned in step 616, and the algorithm ends in step 618.

As can be seen from the foregoing, worst case performance is dependent on the arrangement of cell data within data Blobs, and on the form of incoming queries. This problem is addressed further in the "cell data optimization" section below.

Interleaving

The index structure described above is a regular tree, i.e. one in which every distinct value at one level branches to a distinct sub-tree at the next level. In this section a modification to the regular tree is described which provides higher performance while retaining efficient storage and high concurrency.

The performance of the multidimensional index of the preferred embodiment of the invention is inversely proportional to the number of distinct tree nodes (i.e. blobs in the example discussed above) accessed to find, insert, or delete a cell address. The index performs optimally where a large number of cell addresses that differ only by their last member (i.e. lowest member in the tree) must be accessed. Conversely, the index performs progressively worse when a large number of cells that differ by members earlier in their address must be accessed.

Figure 7:
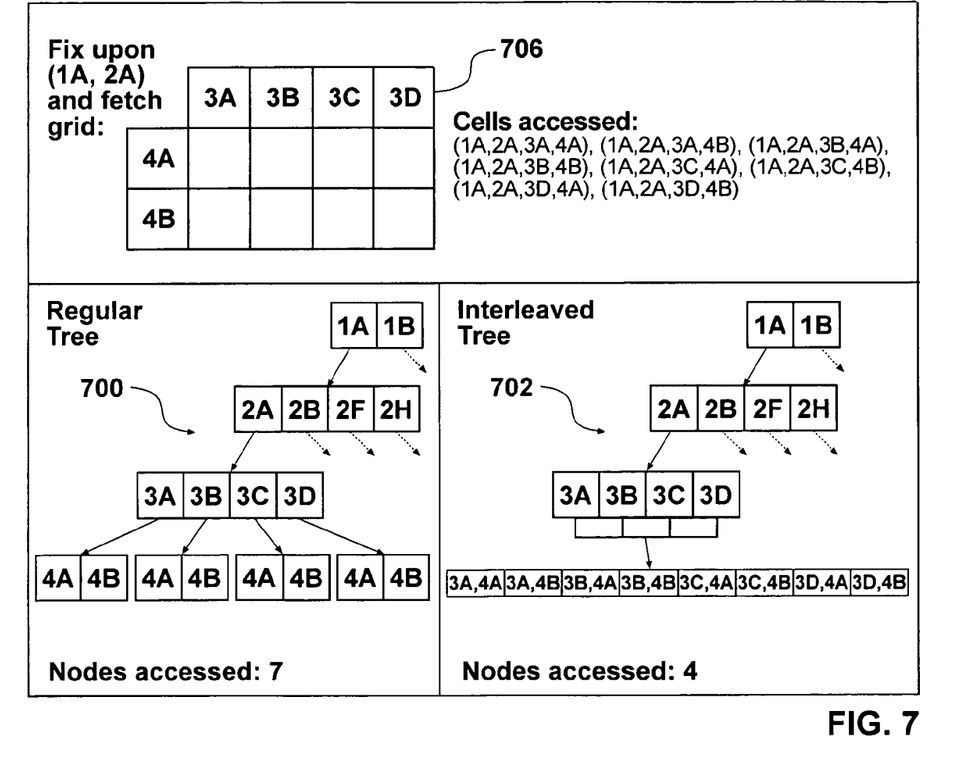
FIG. 7: illustrates interleaving according to the invention of an index structure.

We have found that performance can be increased by merging related leaf-level nodes. By merging nodes, the total number of tree node I/O operations required to find/insert/delete a set of cells can be significantly reduced. In FIG. 7 the number of tree nodes accessed to service a typical query is shown in two different tree structures. The first generally referenced 700, is a regular tree. The second generally referenced 702, is an interleaved tree in which the nodes of the lowest level of the tree i.e. the fourth dimension have been interleaved. Each level of the tree represents a different dimension and the grouped squares each represent nodes in the tree. The task in relation to each tree is to fix upon (1A,2A) and fetch the grid 706 which requires accessing the following cells:

(1A, 2A, 3A, 4A), (1A, 2A, 3A, 4B), (1A, 2A, 3B, 4A), (1A, 2A, 3B, 4B), (1A, 2A, 3C, 4A), (1A, 2A, 3C, 4B), (1A, 2A, 3D, 4A), (1A, 2A, 3D, 4B)

Using the regular tree, seven nodes need to be accessed. Using the interleaved tree, only four nodes must be accessed.

By interleaving the lowest level of tree 702, performance has been improved for any queries iterating upon the last and second-to-last dimensions. Thus query or access history may be used to obtain information on which sub-trees should be interleaved. Note that performance for any other queries has not been sacrificed. The only disadvantage is a slight reduction in the potential for concurrency.

Interleaving is a tradeoff between performance and concurrency. By merging sub-trees that are likely to be accessed together into a common unit the invention:

1. Reduces the cost of random access within related sub-trees.
2. Decreases the potential for concurrent operations within the sub-trees due to holding locks over a larger region of the multidimensional space Interleaving is configured by two parameters: Height, and Width.

Height: The number of dimensions to interleave. This parameter is in the range (0, DimCount), where DimCount is the number of dimensions in the multidimensional data model. A height value of zero produces a non-interleaved tree, whereas a value of DimCount produces a tree that is completely interleaved into one level of nodes. We have found that useful values of height are typically those that cover only the lowest two or three dimensions.

Width: The number of members within one dimension to be interleaved into the same relational database record (i.e. Blob in the example described). This parameter is in the range (2 . . . MemberCount), where MemberCount is the number of members in the dimension. Useful values for width are typically in the range (5 . . . 20).

Figure 8:
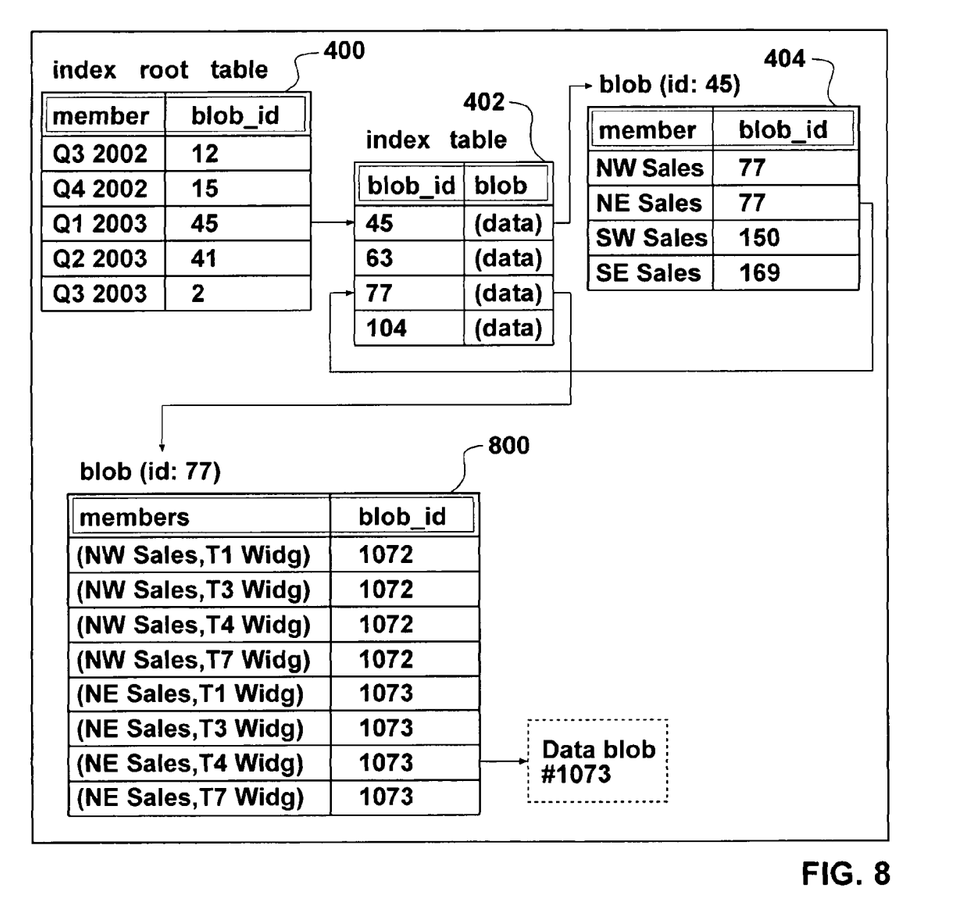
FIG. 8: illustrates relational database tables showing an interleaving process.

In FIG. 8 the relational database entries for the example described with reference to FIG. 4 are again shown but this time the lowest two dimensions i.e. Product and Region have been interleaved i.e. merged. Thus NW Sales and NE Sales both map to blob_id 77. Blob_id 77 relates to table 800 which contains the relevant data blob identifiers.

Index Dimension Re-ordering

The multidimensional index of the invention has been described above as a tree structure in which all nodes that are the same distance from the root hold members for the same dimension. This property is termed Homogeneous Dimension Ordering in this document.

In this section a mechanism is described by which re-organization of dimension order is allowed within independent sub-trees. In this re-organized tree, nodes at the same distance from the root may hold members for different dimensions. This property is termed Heterogeneous Dimension Ordering in this document. By re-ordering dimensions within sub-trees we can individually optimize each sub-tree to suit the way in which it is being accessed.

Figure 9:
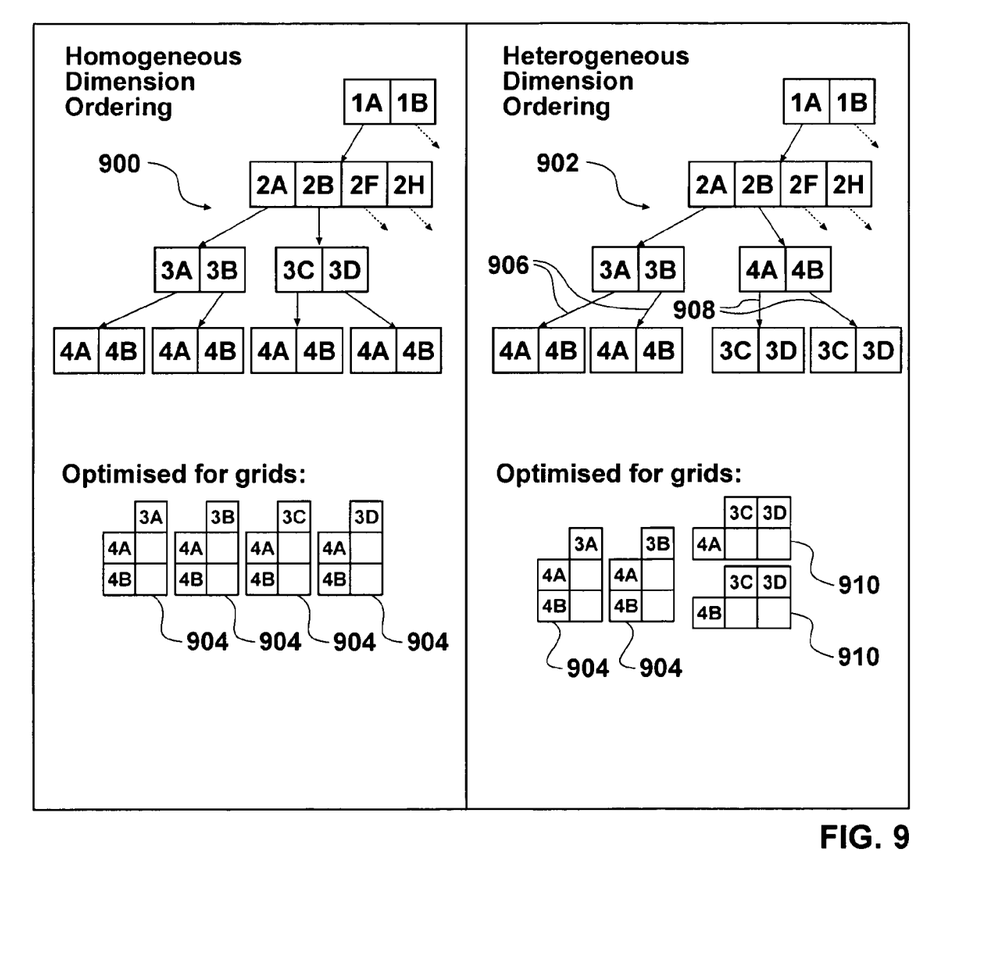
FIG. 9: illustrates dimension re-ordering according to the invention.

FIG. 9 illustrates the same cell addresses stored in a homogeneous dimension ordered tree referenced 900, and in a heterogeneous dimension ordered tree referenced 902. The general structure of the trees accords with the description provided above.

Although both trees contain the same cell addresses they are each optimized for different types of access. Tree 900 is optimized for a single type of grid 904, whereas tree 902 contains sub-trees 906 optimized for one type of grid 904, and other sub-trees 908 optimized for another type of grid 910.

Thus fetching (1A, 2B, 4A, 3C) and (1A, 2B, 4A, 3D) requires access to more nodes using tree 900 than using tree 902.

The heterogeneous dimension described herein allows organization of the tree such that optimal performance can be achieved when different areas of the tree are accessed in different ways.

Figure 10:
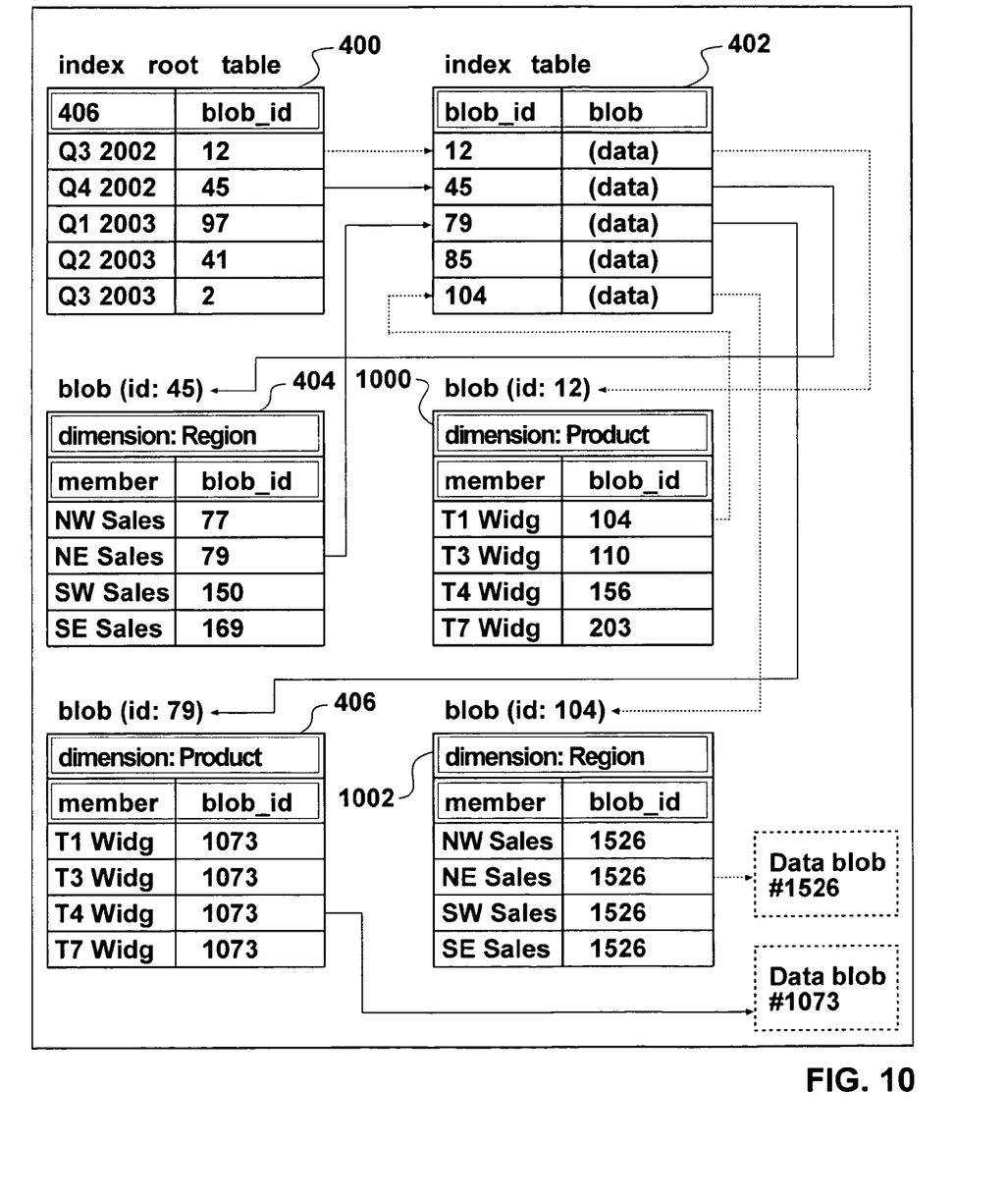
FIG. 10: illustrates relational database tables showing a dimension re-ordering process.

In FIG. 10 the relational database entries for the example described with reference to FIG. 4 are again shown but this time with a hypothetical heterogeneous dimension ordering. Thus cell (Q4 2002, NE Sales, T4 Widg) referred to in the earlier example is indexed by dimension order (Time, Region, Product). However, cell (Q3 2002, NE Sales, T1 Widg) is located through blob_id 12 (table 1000) and blob_id 104 (table 1002). So this cell is indexed by dimension order (Time, Product, Region).

In the preferred embodiment of the invention optimal index dimension ordering for sub-trees is determined through statistical analysis of fetch/update/insert operations. An algorithm according to a preferred embodiment of the invention is set forth below which can be applied to the entire tree or to any sub-tree, and can be run as a synchronous, asynchronous, or offline process.

Index Dimension Re-ordering Algorithm

Define localRoot to be the root of the sub-tree this algorithm is to re-order.

Define REORDERING_THRESHOLD to be a real-valued number in the range (0,1).

For the sub-tree starting at node localRoot do:
1. Determine the set of fixed dimensions. These are the dimensions in the tree from the root down to localRoot, including localRoot.

2. Collate all cell addresses from fetch/update/insert queries that accessed cells that exist (or would exist, in the case of missing cells) in this sub-tree.
3. Perform a member frequency analysis of the cell addresses' non-fixed dimensions i.e. for each non-fixed dimension, count the number of distinct members encountered over the set of cell addresses. By way of example, this might look like:

| Non-fixed dim | Number of distinct members |
|---|---|
| 4 | 12 |
| 3 | 1246 |
| 5 | 1 |

Produce a list of the non-fixed dimensions, sorted into non-decreasing frequency of member change i.e. take the above results and sort the non-fixed dimensions by the number of distinct members encountered in each (least changing to most changing).
For the above, this would look like:
Non-fixed dim:
5
4
3
4. Rebuild the index sub-tree beneath localRoot, ordering the non-fixed dimensions according to the list generated in 3. Do not change the order of any two dimensions unless their frequencies of member change differ by a proportion larger than REORDERING_THRESHOLD.

Cell Data Optimization

The preferred embodiment includes a cell data optimizer which is a subsystem that is responsible for arranging cells within cell data blobs. It has two different responsibilities.
1. When a new cell is created, it inserts that cell into a data blob such that it is likely to cohabit with other cells that will be accessed along with it.
2. Reorganization of existing cells within data blobs in order to provide optimal performance and concurrency for typical queries.

The first responsibility is enacted synchronously with cell insertion, whereas the second can be performed as a synchronous, asynchronous, or even offline process.

This creates a grouping problem, which can be considered in the following abstract terms:

1. Arrange data items (which may be termed points) into groups (which may be termed containers) such that points that are likely to be accessed together reside in the same container, and those that are not likely to be accessed together do not reside together.

2. Define a function $f(p_0, p_1)$ to return a continuous value in the range (0, 1), where a value of 1 indicates points $p_0$ and $p_1$ are 100% likely to be accessed together, and 0 indicates points $p_0$ and $p_1$ are 0% likely to be accessed together.

3. Define a container to be a group in which $S_{max}$ points may reside, where $S_{max}$ is a non-zero positive integer. The number of containers allowed is unlimited.

The problem to be solved may be defined as "Arrange the points within containers such that points with a high mutual value of f reside in the smallest possible number of containers, and points with a low mutual value of f reside in different containers."

Two complementary strategies exist for solving this group optimization problem; Reactive, and Pre-emptive. These strategies are fundamentally different, but are not necessarily mutually exclusive:
Reactive: Organize points such that they will be grouped optimally for historical access. This strategy aims to improve the performance of access that occurs repeatedly.
Pre-emptive: Organize points such that they will be grouped optimally for access that has not yet occurred but is deemed likely to occur. This strategy aims to improve the performance of potential access that is very similar to, but distinct from, historic access.

Cell data grouping in relation to the invention is a specific case of the abstract grouping problem described above. Each cell corresponds to a point in the abstract problem, and each cell data blob to a container.

A good solution to this problem will exhibit two properties:
1. The cells required for each "typical" query will usually reside in a very small number of cell data blobs compared with the number of cells. When the cost of accessing each cell data blob is high, this property maximizes performance by minimizing the number of cell data blob I/O requests.
2. Cells that are not required for a typical query are unlikely to reside in the cell data blobs accessed by the query. In a multi user system where each cell data blob can be accessed by only one participant at a time, this property maximizes potential concurrency.

In the absence of full and exact knowledge of how cells will be accessed, this optimization problem does not have a definitive solution. Instead, a best guess must be made according to our knowledge of the data domain, and by making predictions based on historic access to cell data.

The invention divides optimization of cell data grouping into two levels: Macroscopic and Microscopic.
Macroscopic optimization is pre-emptive, and occurs when the index dimension re-ordering algorithm described above acts upon an index sub-tree. If dimension order was changed within the sub-tree, all cells within the sub-tree are then re-organized within data blobs to minimize the cost of a hypothetical depth-first traversal on the new index sub-tree hierarchy.
Microscopic optimization is reactive, and can occur at any time. This optimization reorganizes cells within data blobs to minimize the cost of recurring access.

A preferred algorithm for Macroscopic Cell Data Optimization is set forth below.

Algorithm for Macroscopic Cell Data Optimization

Define localRoot to be the root of the index sub-tree for which the index dimension re-ordering algorithm (described above) has just been run.

Define CDT_PATH_LIMIT to be a non-zero positive integer in the range (1 . . . DimCount), where DimCount is the number of dimensions in the multidimensional outline.

Define function "Cell Difference Threshold" CDT(blob, cell) to return a Boolean value (true or false). CDT return true when the median index path distance between cell and each cell in blob exceeds CDT_PATH_LIMIT.

Define function "Blob Termination Condition" BTC(blob, cell) to return a Boolean value. BTC returns true when blob is full, or when CDT(blob, cell) returns true.

If the index dimension ordering beneath localRoot has not changed, then terminate here.

Otherwise:
1. Allocate a new cell data blob $B_{new}$.
2. Perform a depth-first traversal of cells starting from localRoot. Move each cell $C_{current}$ from its current cell data blob $B_{old}$ into $B_{new}$ until $BTC(B_{new}, C_{current})$ returns true. When BTC returns true, store the current $B_{new}$, and then allocate another $B_{new}$. Whenever $B_{old}$ becomes empty, delete it.

Microscopic cell data optimization may involve identification of all cells that have been accessed and the number of times that each cell has been accessed in a known query or set of queries, then determining which cells have been accessed more frequently than others. For each of the frequently accessed cells an analysis can be performed to determine which other cell has been most frequently accessed along with that frequently accessed cell. Then one or both of those cells can be moved into the same block.

A preferred algorithm for microscopic cell data optimization is set forth below.

Algorithm for Microscopic Cell Data Optimization

Define RELOCATION_THRESHOLD to be a real-valued number in the range (0, 1).

Define $Q_{profile}$ to be the set of queries for which data is being optimized.

Define $Q_n$ to be the nth query in $Q_{profile}$.

Define $C_{all}$ to be the set of all cells accessed by queries $Q_{profile}$.

Define $C_{intersected}$ to be the subset of cells in $C_{all}$ that are accessed by more than one query.

Define $C_{isolated}$ to be the subset of cells in $C_{all}$ that are accessed by one query only. i.e. $C_{isolated} \cap C_{intersected} = \{\}$, and $C_{isolated} \cup C_{intersected} = C_{all}$.

Define function $AdjacencyLevel(C_0, C_1)$ to return a positive integer specifying the number of queries that access cells $C_0$ and $C_1$ together. Note that if the same query has been run repeatedly, the value of AdjacencyLevel increases by one for each time.

Calculate $Cost_0$, the cost of data access for all queries in $Q_{profile}$.

```
For each intersected cell C_i in C_intersected do
{
    Determine C_imax, the cell C_test in C_isolated for which
    AdjacencyLevel(C_i, C_test) is maximized.
    Move C_i into C_imax's blob group.
}
```

Calculate $Cost_1$, the proposed cost of data access for all queries in $Q_{profile}$ for the new cell arrangement.

```
if(Cost_0 - Cost_1) / Cost_0 > RELOCATION_THRESHOLD
{
    Relocate cells as proposed.
}
```

Where in the foregoing description, reference has been made to specific components or integers of the invention having known equivalents then such equivalents are herein incorporated as if individually set forth.

Although this invention has been described by way of example and with reference to possible embodiments thereof, it is to be understood that modifications or improvements may be made thereto without departing from the scope of the invention.

The invention claimed is:

1. A method of reorganizing existing data in a multidimensional database, the method comprising:
   providing a multidimensional data storage model in which data is located in cells that are stored and retrieved in blocks, each block comprising one or more cells;
   providing a multidimensional logical access model independent of the multidimensional data storage model, the multidimensional logical access model comprising a tree index having one or more leaf nodes each corresponding with a cell and pointing to a block in the multidimensional data storage model containing the cell;
   gathering, by a computer system, historical data access information derived from a plurality of user queries of the multidimensional database, the gathered historical data access information comprising identifications of all existing cells that have been accessed and the number of times that each cell has been accessed;
   determining, by the computer system, for a first frequently-accessed cell, a second cell which is most frequently accessed along with the first frequently-accessed cell, using the gathered historical data access information; and
   reorganizing, by the computer system, one or more selected existing cells in the multidimensional data storage model by moving one or both of the first frequently-accessed and second cells into the same block irrespective of the data located therein to minimize the number of blocks retrieved to access cells required in response to a typical user query of the multidimensional database whereby the multidimensional data access model is optimized to respond to queries that are incongruent with the structure of the multidimensional logical access model.

2. The method as claimed in claim 1 wherein the reorganizing of one or more selected cells into one or more blocks further comprises reorganizing cells such that cells that are unlikely to be accessed together are not provided in the same block.

3. A computerized apparatus in communication with a multidimensional database and including a program to perform the method of claim 2.

4. The method as claimed in claim 1 wherein the reorganizing includes performing a first calculation of the cost of access to the one or more selected cells prior to reorganization and a second calculation of the expected cost of access to the one or more selected cells after reorganization, and reorganizing the one or more selected cells if the second calculation returns a lower cost than the first calculation.

5. The method as claimed in claim 1 wherein the tree index is a dimensionally hierarchical index tree.

6. The method as claimed in claim 5 including determining from the historical data access information one or more selected sub-trees of the multidimensional logical access model that index selected cells that are likely to be accessed together, and
   re-ordering the structure of the one or more of selected sub-trees by either merging the selected one or more sub-trees, or re-ordering the dimensional hierarchy of the one or more selected sub-trees so that fewer branches of the dimensionally hierarchical index tree are required to be accessed to access the selected cells.

7. The method as claimed in claim 6 wherein merging the one or more selected sub-trees includes merging related leaf level nodes of the one or more sub-trees.

8. The method as claimed in claim 6 including merging the lowest two or three dimensions.

9. The method as claimed in claim 6 including merging two to fifty members in a dimension.

10. The method as claimed in claim 6 wherein re-ordering the dimensional hierarchy includes performing a member frequency analysis for the selected cells non-fixed dimensions, sorting the results of the analysis to provide a list of non-fixed dimensions sorted by the number of members in each from the non-fixed dimension with the least number of members to the non-fixed dimension with the largest number of members, and re-ordering the one or more sub-trees in accordance with the list.

11. The method as claimed in claim 10 including providing a re-ordering threshold, and changing the order of any two dimensions if the proportional difference between the members for each dimension is greater than the re-ordering threshold.

12. The method as claimed in claim 10 including re-organizing cells within blocks following any change in dimension order.

13. The method as claimed in claim 12 including defining a path limit, analysing the index path distance between each cell in the one or more sub-trees and the block to which the cell belongs, and re-organising the cell into another block if the index path for the cell exceeds the path limit.

14. The method as claimed in claim 1 wherein reorganization of the one or more selected existing cells in the multidimensional data storage model does not necessitate any change to the multidimensional access model.

15. The method as claimed in claim 1 wherein the historical data access information includes statistical information identifying cells that are likely to be accessed in future user queries.

16. The method as claimed in claim 1 wherein the time required to access a cell in a previously retrieved block is less than the time required to access a cell in a non-retrieved block.

17. A computer readable medium containing instructions to cause a computer to perform the method of claim 1.

* * * * *